United States Patent
Oh et al.

(10) Patent No.: US 8,699,596 B2
(45) Date of Patent: Apr. 15, 2014

(54) METHOD FOR DETECTING MULTIPLE INPUT MULTIPLE OUTPUT SIGNAL IN WIRELESS COMMUNICATION SYSTEM AND APPARATUS FOR THE SAME

(75) Inventors: Jong Ee Oh, Daejeon (KR); Yu Ro Lee, Daejeon (KR); Sok Kyu Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/444,785

(22) Filed: Apr. 11, 2012

(65) Prior Publication Data

US 2012/0320954 A1    Dec. 20, 2012

(30) Foreign Application Priority Data

Jun. 17, 2011   (KR) .................. 10-2011-0059275

(51) Int. Cl.
*H04K 1/10* (2006.01)
*H04L 27/28* (2006.01)

(52) U.S. Cl.
USPC ..................... 375/260; 370/210; 375/267

(58) Field of Classification Search
None
See application file for complete search history.

(56) References Cited

U.S. PATENT DOCUMENTS

| | | | | |
|---|---|---|---|---|
| 4,891,806 | A * | 1/1990 | Farias et al. | 370/503 |
| 6,591,395 | B1 * | 7/2003 | Tsai | 714/795 |
| 2009/0296842 | A1 * | 12/2009 | Papadopoulos et al. | 375/260 |

OTHER PUBLICATIONS

M. Joham et al., "FPGA Implementation of MMSE Metric Based Efficient Near-Mil Detection", International ITG Workshop on Smart Antennas 2008, Feb. 2008, pp. 139-146.

* cited by examiner

*Primary Examiner* — Leon-Viet Nguyen

(57) ABSTRACT

A method for detecting a multiple input multiple output (MIMO) signal in a wireless communication system is provided. The method includes: selecting from a first antenna each of the first candidate signal constellations in which a first path metric for at least one first survivor path is minimal; acquiring at least one second survivor path based on the first candidate signal constellations; updating a second survivor path so as to remove an effect on the second survivor path due to the first candidate signal constellations; selecting from a second antenna each of the second candidate signal constellations in which a second path metric for the at least one updated second survivor path is minimal; acquiring at least one final survivor path based on the second candidate signal constellations; and acquiring a transmitting symbol among the final survivor paths.

12 Claims, 22 Drawing Sheets

METHOD FOR DETECTING MULTIPLE INPUT MULTIPLE OUTPUT SIGNAL IN WIRELESS COMMUNICATION SYSTEM AND APPARATUS FOR THE SAME

CROSS-REFERENCE TO RELATED APPLICATIONS

This application claims the benefit of priority of Korean Patent Application No. 10-2011-0059275 filed on Jun. 17, 2011, which is incorporated by reference in their entirety herein.

BACKGROUND OF THE INVENTION

1. Field of the Invention

The present invention relates to a wireless communication system, and more particularly, to a method for detecting a received signal in a multiple input multiple output (MIMO) transceiving system and a method for supporting the same.

2. Related Art

Recently, various wireless communication technologies are under development with advancement of information communication technologies. In addition, in the recent wireless communication environment, high-rate data transmission is required, but available wireless resources have a limitation. Therefore, an interest in a method for increasing throughput of wireless communication has been increased. This increases an interest in a multiple input multiple output (MIMO) transmission mechanism in a wireless communication system.

Indices of determining performance of a wireless communication system may be a data throughput and a link range. The MIMO transmission mechanism may improve a data throughput and a link range of wireless communication without an increase in a bandwidth of a usable frequency and a transmission power for data transmission. This MIMO transmission has been supported in IEEE 802.11n, 3GPP long term evolution (LTE), WiMAX, HSPA+, or the like. The tendency to apply the MIMO transmission to a digital video broadcasting (DVB) system has currently appeared.

Unlike the existing transmission mechanisms for performing wireless communication using a single antenna, a wireless communication system supporting the MIMO transmission mechanism uses a plurality of antennas to simultaneously transmit the same data several times or transmits another data through another antenna, thereby improving the reliability of transmission and the throughput of the entire wireless communication system.

In order to approximate theoretical channel capacity using a system with a channel code concatenated with a vertical bell labs layered space-time architecture (V-BLAST) system suggested as a practical MIMO system, a need exists for a process of creating soft decision information as an input of a channel decoder from the V-BLAST system. The soft decision information as the input of the channel decoder corresponds to a log-likelihood ratio (LLR) for each transmitting bit mapped to modulated constellation. When performing the soft decision according to a maximum likelihood algorithm, calculation complexity is increased with the increase in the number of antennas configuring the MIMO transceiving system, which leads to many limitations to implement the maximum likelihood algorithm using a substantial hardware. On the other hand, other algorithms proposed so as to lower the calculation complexity have considerable deterioration in performance, as compared with the maximum likelihood algorithm. Therefore, a need exists for an algorithm having little deterioration in performance while lowering the calculation complexity, as compared with the maximum likelihood algorithm.

SUMMARY OF THE INVENTION

The present invention provide a method for detecting an improved multiple input multiple output (MIMO) signal capable of maintaining existing accuracy while reducing complexity in a method for detecting a signal of an MIMO transceiving system.

In an aspect, a method for detecting a Multiple Input Multiple Output (MIMO) signal in a wireless communication system is provided. The method includes: selecting from a first antenna each of the first candidate signal constellations in which a first path metric for at least one first survivor path is minimal; acquiring at least one second survivor path based on the first candidate signal constellations; updating a second survivor path so as to remove an effect on the second survivor path due to the first candidate signal constellations; selecting from a second antenna each of the second candidate signal constellations in which a second path metric for the at least one updated second survivor path is minimal; acquiring at least one final survivor path based on the second candidate signal constellations; and acquiring a transmitting symbol among the final survivor paths.

The step of the acquiring of the transmitting symbol may include: selecting an estimation symbol having a minimum distance among the at least one final survivor paths; and determining a symbol as the transmitting symbol among the at least one final survivor paths, the symbol has a different bit with that of the estimation symbol and corresponding to a minimum distance.

The step of the acquiring of the at least one second survivor paths may include: acquiring a first additional path based on the first candidate signal constellations; and selecting at least one path as the second survivor path among the first survivor path and the first additional path, the at least one path having a minimum distance.

The step of the acquiring of the at least one final survivor path may include: acquiring a second additional path based on the second candidate signal constellations; and selecting at least one path as the at least one final survivor path among the updated second survivor path and the second additional path, the at least one path having a minimum distance.

The step of the acquiring of the first additional path based on the first candidate signal constellations may include: selecting N first intermediate paths in which a distance of the first survivor path among the at least one first survivor path is minimal; and selecting N first additional signal constellations having a minimum distance in the first signal constellation for each of the first intermediate paths to acquire $N^2$ first additional paths.

The N may be equal to or smaller than M that is the number of at least one first survivor paths.

The distance of the first survivor path may be added with a first path metric value so as to be updated, and the distance of the updated second survivor path may be added with a second path metric value so as to be updated.

In another aspect, a wireless device is provided. The device includes a transceiver receiving a wireless signal and a processor operatively coupled to the transceiver. The transceiver includes a first antenna and a second antenna. The processor is configured for: selecting from a first antenna each of the first candidate signal constellations in which a first path metric for at least one first survivor path is minimal; acquiring at least one second survivor path based on the first candidate signal constellations; updating a second survivor path so as to remove an effect on the second survivor path due to the first candidate signal constellations; selecting from a second antenna each of the second candidate signal constellations in which a second path metric for the at least one updated second survivor path is minimal; acquiring at least one final survivor path based on the second candidate signal constellations; and acquiring a transmitting symbol among the final survivor paths.

The processor may include a shifter and an adder, and the first path metric and the second path metric are calculated by the shifter and the adder.

The processor may include a shifter, and the first path metric and the second path metric are calculated by the shifter.

DESCRIPTION OF EXEMPLARY EMBODIMENTS

Figure 1A:
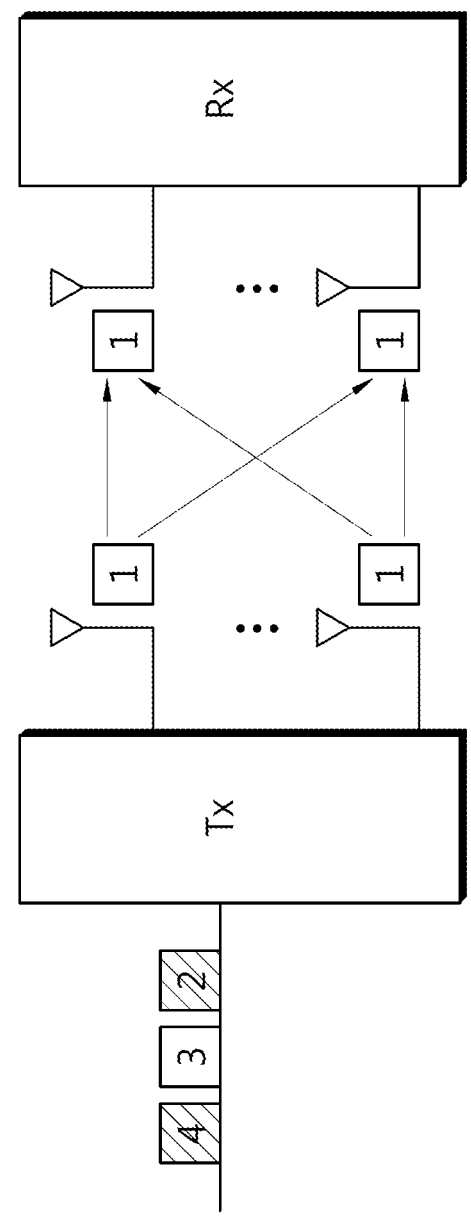
FIGS. 1A and 1B are diagrams showing a multiple input multiple output (MIMO) transmission mechanism that may be applied to an embodiment of the present invention.

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification.

Unless explicitly described to the contrary, the term "comprise" and variations such as "comprises" or "comprising" will be understood to imply the inclusion of stated elements but not the exclusion of any other elements. A term "module" described in the specification means a single unit of processing a predetermined function or operation and can be implemented by hardware or software or a combination of hardware and software.

Figure 1B:
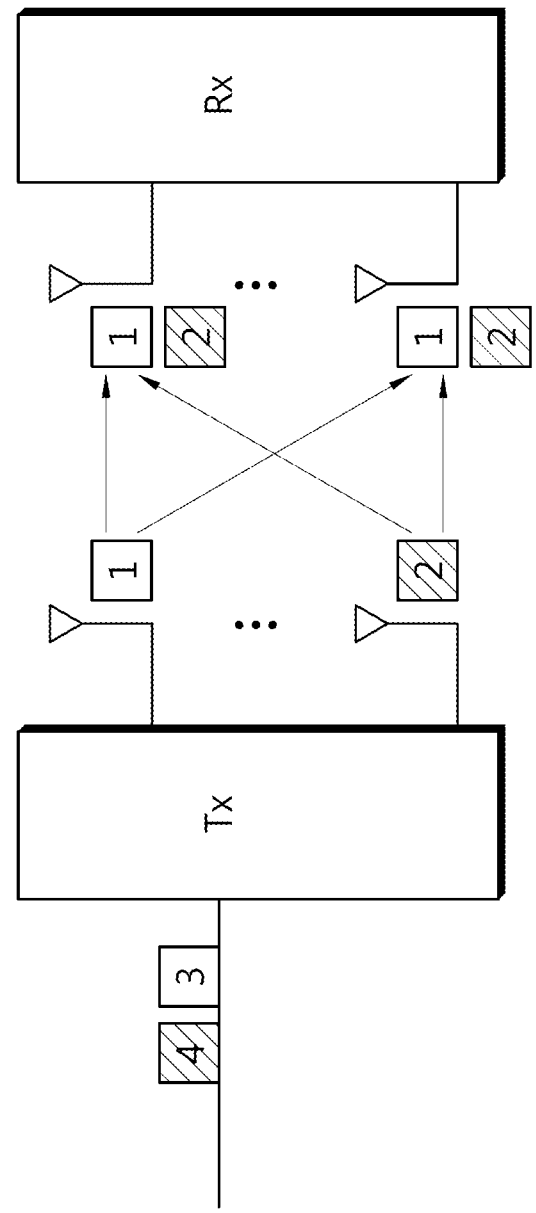

FIGS. 1A and 1B are diagrams showing a multiple input multiple output (MIMO) transmission mechanism that may be applied to an embodiment of the present invention. FIG. 1A shows an MIMO transmission method based on a spatial diversity scheme; and FIG. 1B shows an MIMO transmission method based on a spatial multiplexing scheme.

Referring to FIG. 1A, a transmitting end Tx includes two transmitting antennas, and a receiving end Rx includes two receiving antennas. The transmitting end performs precoding so as to map the same data having a bit stream format to both of the transmitting antennas and performs beamforming and MIMO transmission, in performing the MIMO transmission. Therefore, the receiving end may receive signals passing through MIMO radio channels through the two antennas and select signals less affected by fading among the received signals or synthetically receive signals based on the received signals to thereby obtain original data.

In the case of the MIMO transmission based on the spatial diversity scheme, signals received from antennas spaced apart from each other are subjected to different phase changes, such that they have low correlation with each other. As a result, two signals are independent from each other with respect to multipath fading. Therefore, when one of the two signals is significantly affected by fading, the possibility that the other of the two signals will be weakly affected by the fading is high. Accordingly, when the two signals are synthesized, a signal having less multi-path fading may be obtained. Although the MIMO transmission based on the spatial diversity scheme does not improve a data rate in data transmission, it may improve reliability of the transmission by a diversity gain.

Referring to FIG. 1B, a transmitting end Tx includes two transmitting antennas, and a receiving end Rx includes two receiving antennas. The transmitting end performs precoding so as to map different bit streams to each transmitting antenna and performs beamforming and MIMO transmission, in performing the MIMO transmission. Therefore, the receiving end may receive signals passing through MIMO radio channels through the two antennas and simultaneously obtain independent data streams since each of the received signals is a signal for an independent bit stream.

The MIMO transmission based on the spatial multiplexing scheme may increase channel capacity in a high signal to noise ratio (SNR). However, although the spatial multiplexing scheme may improve the entire data rate in the case in which channels used for wireless signal transmission have characteristics independent from each other, it may cause deterioration in performance in the case in which the channels used for wireless signal transmission are highly or fully correlated channels.

As described above, the spatial multiplexing scheme among the MIMO technologies, different signals are transmitted to the independent sub-channels provided in the MIMO environment, which leads to an increase in a transmission rate. Therefore, in order to sufficiently obtain advantages of the spatial multiplexing scheme, there is a need to use antennas corresponding to the number of sub-channels to be generated at the transceiving end unlike the diversity scheme.

An example of the method for detecting a receiving end of a spatial multiplexing MIMO system such as a vertical-bell laboratory layered space time (V-BLAST) may include a zero forcing mechanism and a minimum mean square error (MMSE) mechanism that are a linear mechanism, an OSIC mechanism that is a non-linear mechanism, and a maximum likelihood (ML) mechanism and a sphere decoding mechanism that may be referred to as an optimal receiving mechanism. In addition, as a transformation algorithm of the sphere decoding mechanism, there is an ML-based QRD-M mechanism.

The linear mechanism is a mechanism that detects only a specific signal at each receiving antenna and considers other signals as an interference signal to minimize an effect of a signal acting as nulling or interference using the ZF or the MMSE. As the non-linear mechanism, there is an ordered successive interference cancellation (OSIC) mechanism that removes a signal sequentially detected according to a detection order to reduce an influence of an interference signal. The ML mechanism shows optimal performance as a mechanism that calculates ML metrics for each of the transmitting signal vectors of a possible combination so as to detect an optimal transmitting signal vector to search the transmitting signal vectors having the smallest ML metrics.

Figure 2:
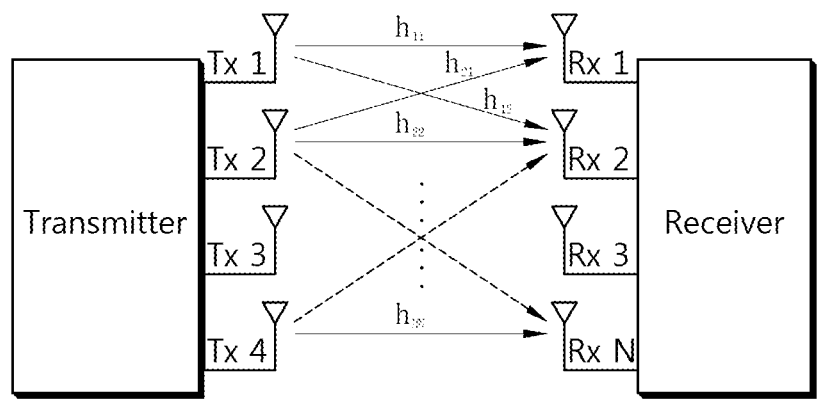
FIG. 2 is a diagram showing an example of an MIMO transceiving system that may be applied to the embodiment of the present invention.
Figure 3:
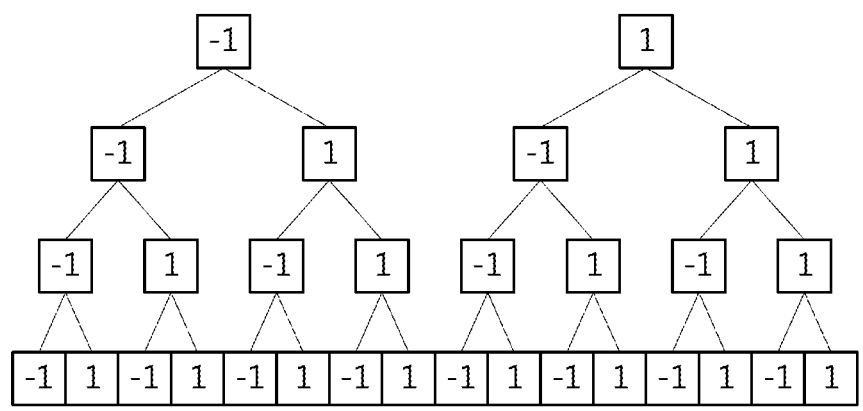
FIGS. 3 to 6 are diagrams showing a step of performing the M-algorithm that is M=16 by a tree structure for each modulation scheme in a 4×4 MIMO transceiving system.
Figure 4:
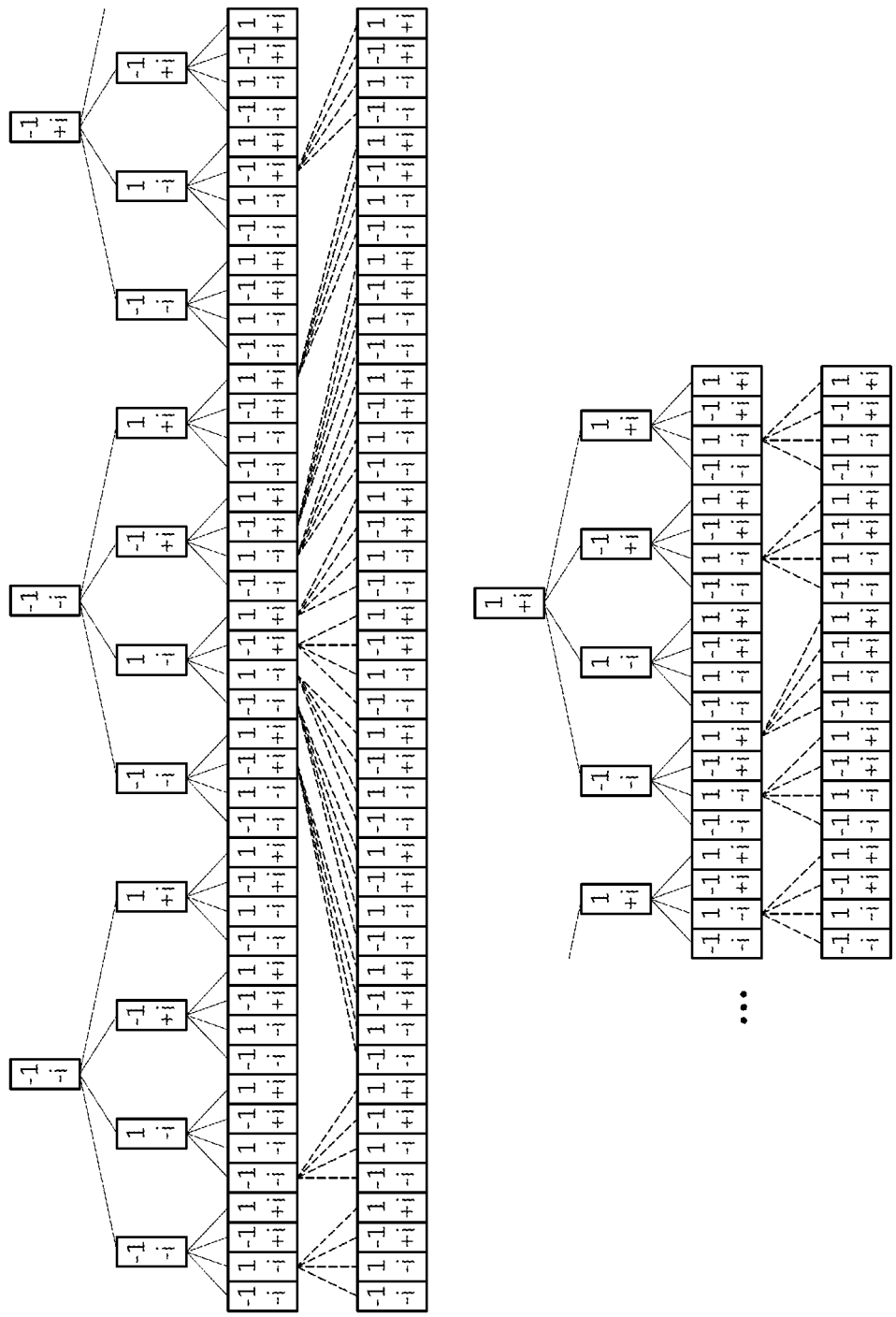
Figure 5:
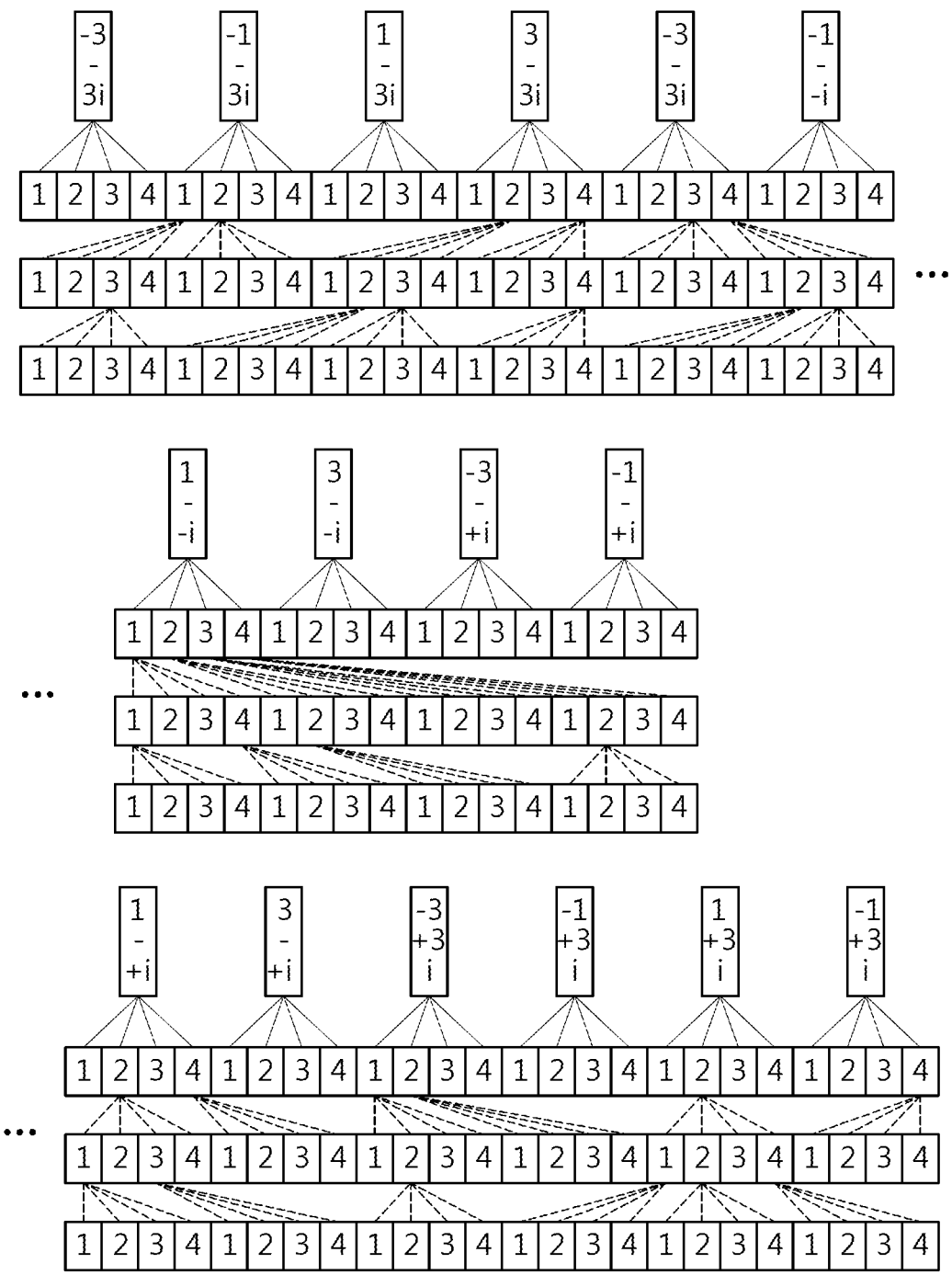
Figure 6:
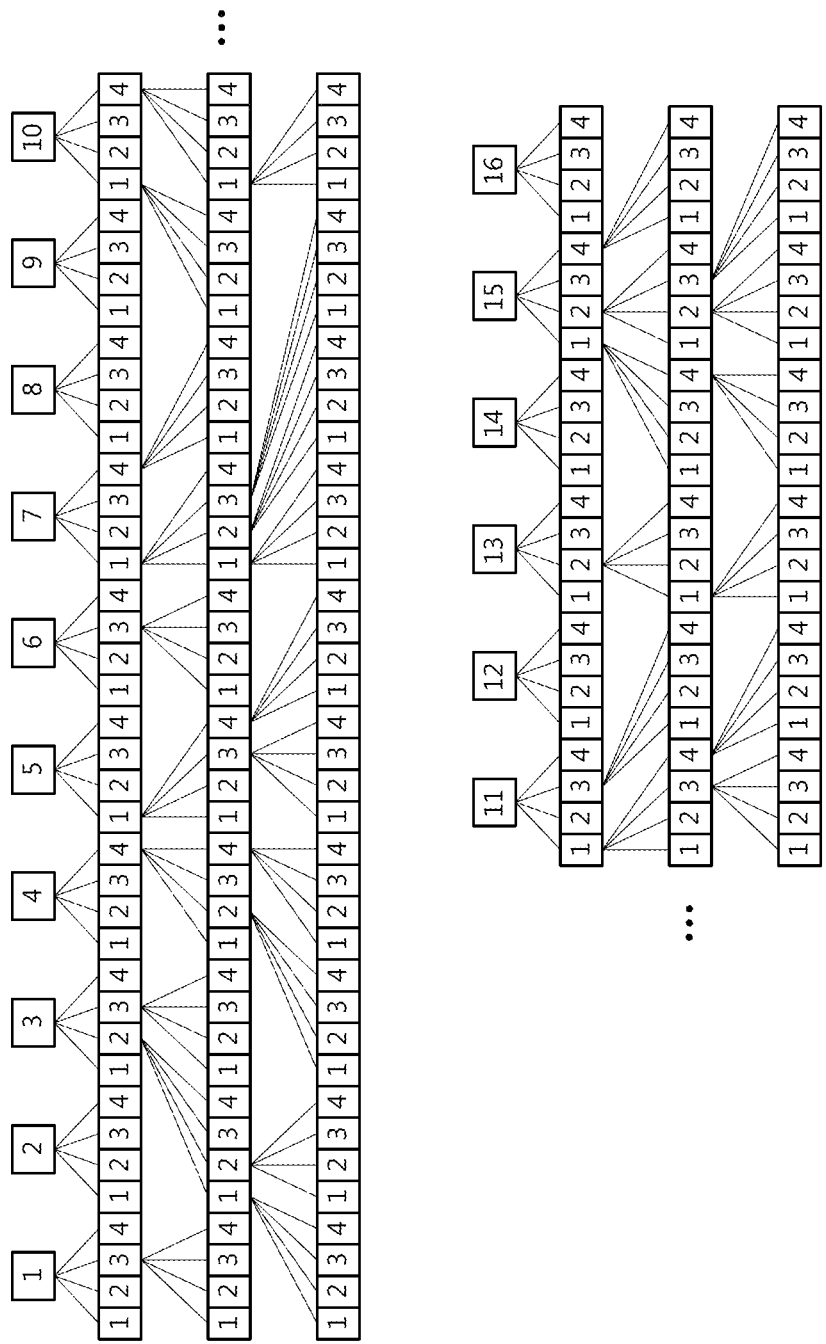

FIG. 2 is a diagram showing an example of an MIMO transceiving system that may be applied to the embodiment of the present invention. The MIMO transceiving system shown in FIG. 2 may include a plurality of sender antennas and a plurality of receiver antennas. FIG. 2 shows that a sender has four transmitting antennas and a receiver has four receiving antennas, which corresponds to only an example. The exemplary embodiment of the present invention may be applied to a general MIMO transceiving system using a plurality of antennas.

When a channel between a sender and a receiver is set to be H, the shown MIMO transceiving system may be represented by the following Equation 1.

$$y' = Hs + n = QRs + n' \quad \text{[Equation 1]}$$

Where y' represents a receiving signal of a receiving end, H represents a channel matrix, s represents a transmitting signal, and n represents an interference signal that may occur at the time of transmitting a signal. In this case, when the channel matrix H is set to be QR decomposition, a normal orthogonal matrix Q and an upper triangular matrix R can be obtained.

When a conjugate transpose matrix of an acquired Q is set to be $Q^H$, Q obtains a unit matrix I such as $Q^H Q = I$ by a characteristic of the normal orthogonal matrix. Therefore, when $Q^H$ is multiplied by both sides of Equation 1, it may be represented by the following Equation 2.

$$y = Q^H y' = Rs + Q^H n' = Rs + n \quad \text{[Equation 2]}$$

When the receiving vector y of the above Equation 2 is represented by a matrix equation, it may be represented by the following Equation 3.

$$\begin{bmatrix} y_1 \\ y_2 \\ y_3 \\ y_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} s_1 \\ s_2 \\ s_3 \\ s_4 \end{bmatrix} + \begin{bmatrix} n_1 \\ n_2 \\ n_3 \\ n_4 \end{bmatrix} \quad \text{[Equation 3]}$$

Where $r_{j,i}$ corresponds to j,i-th component of the upper triangular matrix R and when j>i in consideration of the characteristic of the upper triangular matrix, $R_{j,i}=0$. In addition, $s_i$ corresponds to i-th component of a transmitting signal vector s.

In this case, it is assumed that $s_i = \text{Re}\{s_i\} + j\text{Im}\{s_i\}$, $1 \le i \le 4$ satisfies the following condition as a signal modulated based on signal constellation according to each modulation scheme.

BPSK: $\text{Re}\{s_i\} \in \{-1, 1\}$, $\text{Im}\{s_i\} \in \emptyset$
QPSK: $\text{Re}\{s_i\} \in \{-1, 1\}$, $\text{Im}\{s_i\} \in \{-1, 1\}$
16QAM: $\text{Re}\{s_i\} \in \{-3, -1, 1, 3\}$, $\text{Im}\{s_i\} \in \{-3, -1, 1, 3\}$
64QAM: $\text{Re}\{s_i\} \in \{-7, -5, -3, -1, 1, 3, 5, 7\}$,
$\text{Im}\{s_i\} \in \{-7, -5, -3, -1, 1, 3, 5, 7\}$, Hereinafter, a method for calculating log-likelihood ratio (LLR) of each bit of a transmitting signal using an M-algorithm based on a given y and R will be described.

The receiving signal y shown in Equation 3 may be represented by the following Equation 4.

$$\begin{bmatrix} y_1 \\ y_2 \\ y_3 \\ y_4 \end{bmatrix} \cong \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} \hat{s}_1 \\ \hat{s}_2 \\ \hat{s}_3 \\ \hat{s}_4 \end{bmatrix} \quad \text{[Equation 4]}$$

Where $\hat{s}$ represents a transmitting signal vector.

The LLR of the i-th bit of the transmitted signal may be represented by the following Equation 5.

$$LLR_i \cong \log \frac{\exp\left(-\frac{\|y - R\hat{s}_i^0\|^2}{2\sigma^2}\right)}{\exp\left(-\frac{\|y - R\hat{s}_i^1\|^2}{2\sigma^2}\right)} \quad \text{[Equation 5]}$$

$$= -\frac{1}{2\sigma^2}\left(\|y - R\hat{s}_i^0\|^2 - \|y - R\hat{s}_i^1\|^2\right)$$

Where $\hat{s}_i^j$ is a transmitted signal vector having $\|y - R\hat{s}_i^j\|^2$ most approximating from y while i-th bit is j. According to the M-algorithm, $\hat{s}_i$ sequentially proceeds while an M survivor path remains by the following process. It can be appreciated from Equation 4 that a relation equation for the receiving signal y4 may be the simplest format. Therefore, the M-algorithm may be applied in a manner starting from a layer associated with y4 and gradually proceeding to y1.

$$y_4 \cong r_{44} \hat{s}_4 \text{(first detection layer)} \quad <1>$$

The path metric at the corresponding layer may be given depending on $\|y_4 - r_{44} \cdot \hat{s}_4\|^2$. M $\hat{s}_4$ in which the path metric is minimal is selected. A distance d for the M survivor paths is updated to $d = \|y_4 - r_{44} \cdot \hat{s}_4\|^2$.

The receiving signal relation for the M survivor path is updated depending on the following Equation 6.

$$\begin{bmatrix} y_1 \\ y_2 \\ y_3 \end{bmatrix} = \begin{bmatrix} y_1 \\ y_2 \\ y_3 \end{bmatrix} - \begin{bmatrix} r_{14} \\ r_{24} \\ r_{34} \end{bmatrix} \cdot \hat{s}_4 \quad \text{[Equation 6]}$$

$$y_3 \cong r_{33} \cdot \hat{s}_3 \text{ second detection layer} \quad <2>$$

The path metric at the corresponding layer may be given depending on $\|y_3 - r_{33} \cdot \hat{s}_3\|^2$ based on the updated received signal relation.

Four $\hat{s}_3$ in which the path metric $\|y_3 - r_{33} \cdot \hat{s}_3\|^2$ given for the M survivor paths is minimal is selected. A distance d for 4M paths is updated depending on $d = d + \|y_3 - r_{33} \cdot \hat{s}_3\|^2$.

M survivor paths having a minimum distance are selected from the 4M paths.

The received signal relation for the M survivor path is updated depending on the following Equation 7.

$$\begin{bmatrix} y_1 \\ y_2 \end{bmatrix} = \begin{bmatrix} y_1 \\ y_2 \end{bmatrix} - \begin{bmatrix} r_{13} \\ r_{23} \end{bmatrix} \cdot \hat{s}_3 \quad \text{[Equation 7]}$$

$y_2 \cong r_{22} \cdot \hat{s}_2$ third detection layer  <3>

Four $\hat{s}_2$ in which $\|y_2 - r_{22} \cdot \hat{s}_2\|^2$ for the M survivor paths is minimal is selected.

A distance d for 4M paths is updated depending on $d = d + \|y_2 - r_{22} \cdot \hat{s}_2\|^2$.

M survivor paths having a minimum distance are selected from the 4M paths.

The received signal relation for the M survivor path is updated depending on the following Equation 8.

$$[y_1] = [y_1] - [r_{12}] \cdot \hat{s}_2 \quad \text{[Equation 8]}$$

$y_1 \cong r_{11} \cdot \hat{s}_1$ fourth detection layer  <4>

$4\hat{s}_1$ in which $\|y_1 - r_{11} \cdot \hat{s}_1\|^2$ for the M survivor paths is minimal is selected.

A distance d for 4M paths is updated depending on $d = d + \|y_1 - r_{11} \cdot \hat{s}_1\|^2$.

Maximum likelihood (ML) estimation of the transmitted signal vector is performed on $\hat{s}_{ML}$ having a minimum distance among the 4M paths.

For each bit of the transmitted signal vector, $\hat{s}$ having a minimum distance is searched among the 4M paths while having bits different from $\hat{s}_{ML}$. When $\hat{s}$ having bits different from $\hat{s}_{ML}$ does not exist, a maximum value is set to be a distance. The LLR of the i-th bit is calculated using the obtained distance.

FIGS. 3 to 6 are diagrams showing a step of performing the M-algorithm that is M=16 by a tree structure for each modulation scheme in a 4×4 MIMO transceiving system. Each step represents an antenna performing the determination. A process of selecting 16 shortest survivor paths is performed after updating 64 distances for each step.

Hereinafter, complexity according to each step of the M-algorithm described above will be described.

(Step A) In selecting four $\hat{s}_i$ in which $\|y_i - r_{ii} \cdot \hat{s}_i\|^2$ for the M survivor paths is minimal, so as to select $\hat{s}_i$ in which an absolute value $y_i - r_{ii} \cdot \hat{s}_i$ is minimal, the $y_i - r_{ii} \cdot \hat{s}_i$ is converted into a $y_i/r_{ii}$ form and then, the most approximating two lattice points are obtained in the signal constellation of $\{-7, -5, -3, -1, 1, 3, 5, 7\}$ or $y_i - r_{ii} \cdot \hat{s}_i$ for 8 signal constellations is calculated to obtain the smallest two absolute values. The former scheme has a problem in that a multiplication operation multiplying $1/r_{ii}$ needs to be performed and the latter scheme has a problem in that all candidate groups need to be calculated. $\hat{s}_i$ is an integer and may be implemented by two additions such as $3 = 2 + 1$, $5 = 2^2 + 1$, $7 = 2^3 - 1$, or the like. That is, the former needs the M complex multipliers and the latter needs M×64×3 adders when using a 64 QAM modulation scheme.

(Step B) in updating $d = d + \|y_i - r_{ii} \cdot \hat{s}_i\|^2$ for the 4M paths, 4M distances are updated by using four $\hat{s}_i$ selected for the M survivor paths. The processes need 8M real multipliers and 4M×8 adders.

(Step C) In selecting the M survivor paths having a minimum distance among the 4M paths, a method for aligning 4M by using a Merge-Sort method and then, taking M from the front may be used. In this case, the complexity of the Merge-Sort method using a comparator and a subtractor may be represented by the following Table 1. An example of Table 1 corresponds to the case of using NAND gate counting.

TABLE 1

| Number of Paths(4M) | Number of Comparators | Number of Distance Bits | Complexity | Critical Path |
|---|---|---|---|---|
| 64 | 2,172 | 8 | 451,776 | 1,281 |
|  |  | 16 | 903,552 | 2,457 |
| 256 | 3,839 | 8 | 798,512 | 2,196 |
|  |  | 16 | 1,597,024 | 4,212 |

(Step D) Updating $$y_{i-1} = y_{i-1} - \sum_{j=1}^{4} r_{i-1, j} s_j$$

for the M survivor paths is to remove the influence of received signal due to the selected $\hat{s}_i$ for the M survivor paths.

(Step E) At the step of selecting the ML estimation $\hat{s}_{ML}$ having a minimum distance among the M survivor paths, a method for selecting a minimum value by sequentially comparing two of the M survivor paths by using a comparator may be used. In this case, the complexity may be represented by the following Table 2. Table 2 corresponds to an example of the case of using NAND gate counting.

TABLE 2

| Number of Survivor Paths(M) | Number of Comparators | Number of Distance Bits | Complexity | Critical Path |
|---|---|---|---|---|
| 16 | 15 | 8 | 2,160 | 244 |
|  |  | 16 | 4,320 | 468 |
| 64 | 63 | 8 | 9,072 | 366 |
|  |  | 16 | 18,144 | 702 |

(Step F) In selecting $\hat{s}$ having a minimum distance while having bits different from $\hat{s}_{ML}$ among the M survivor paths, the number of bits different from $\hat{s}_{ML}$ among the M survivor paths for each bit of $\hat{s}_{ML}$ may be a maximum of M−1. In the case of the 4×4 MIMO system using the 64 QAM modulation scheme, $\hat{s}_{ML}$ has 4×6 bits and therefore, complexity 24 times larger than a minimum value calculation complexity of Table 2 is needed.

The following Table 3 shows the complexity of M-algorithm using the number of adders and multipliers. It is assumed that the comparator and the subtractor is implemented a multiplexer (MUX). Table 3 corresponds to an example of a case of using adder/multiplier.

TABLE 3

| Number of Paths (4M) | Number of Survivor Paths (M) | (Step A) | | (Step B and D) | | (Step C) | | (Step E and F) | |
|---|---|---|---|---|---|---|---|---|---|
| | | Adder | Complex Multiplier | Adder | Real Multiplier | 2-2 Adder | MUX | 2-1 Adder | MUX |
| 64 | 16 | 16 | 572 | 128 | 2,172 | 2,172 | 375 | 375 | | |
| 256 | 64 | 64 | 2,304 | 512 | 3,839 | 3,839 | 1,575 | 1,575 | | |

At (Step A), extracting a minimum of four signal constellation after performing the multiplication can be implemented using a lookup table, or the like, without considering the complexity thereof. The case in which the number of survivor paths is 64 shows more excellent performance than the case in which the number of survivor paths is 16, but shows the relatively higher complexity. The reason why the complexity is increased is a multiplication operation such as square operation corresponding to the number of paths for distance calculation, and the like, that are performed by a multiplier corresponding to the number of survivor paths for integer normalization of the signal constellation. Therefore, a method for minimizing the operation is needed. Meanwhile, in terms of the adder, the complexity for distance calculation and update is large but a step of obtaining the minimum value has the similar complexity. Further, it can be appreciated that a process of selecting the survivor paths among the calculated distance has the complexity several times larger than that. Therefore, a method for minimizing the adder operation is needed.

Figure 7:
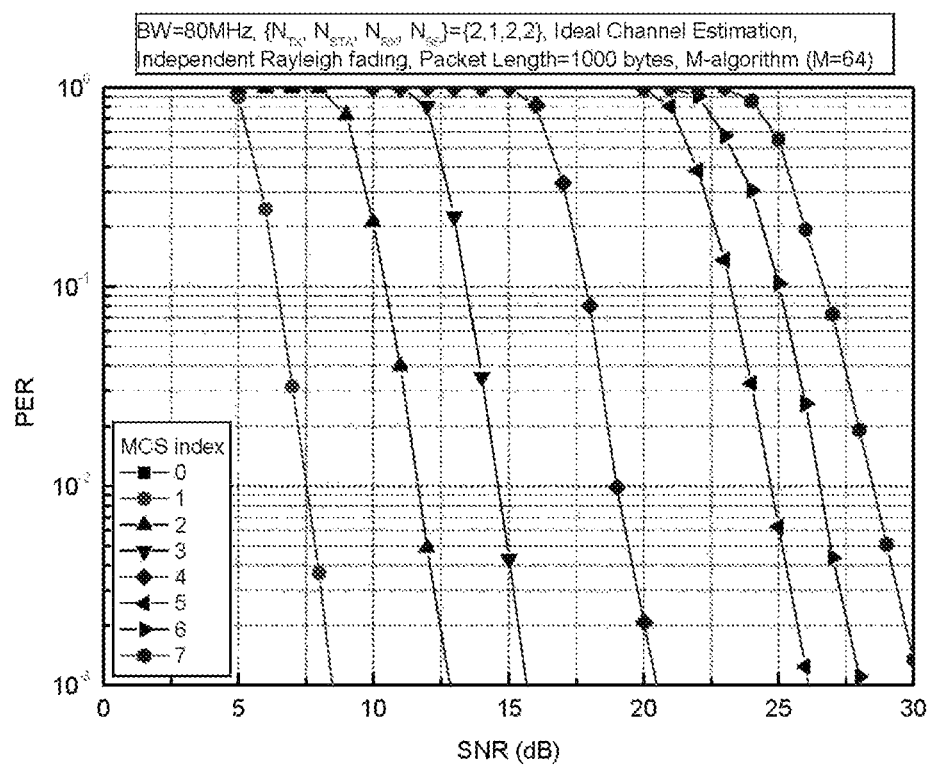
FIG. 7 shows a graph of the performance of a 2×2 MIMO detector.
Figure 8:
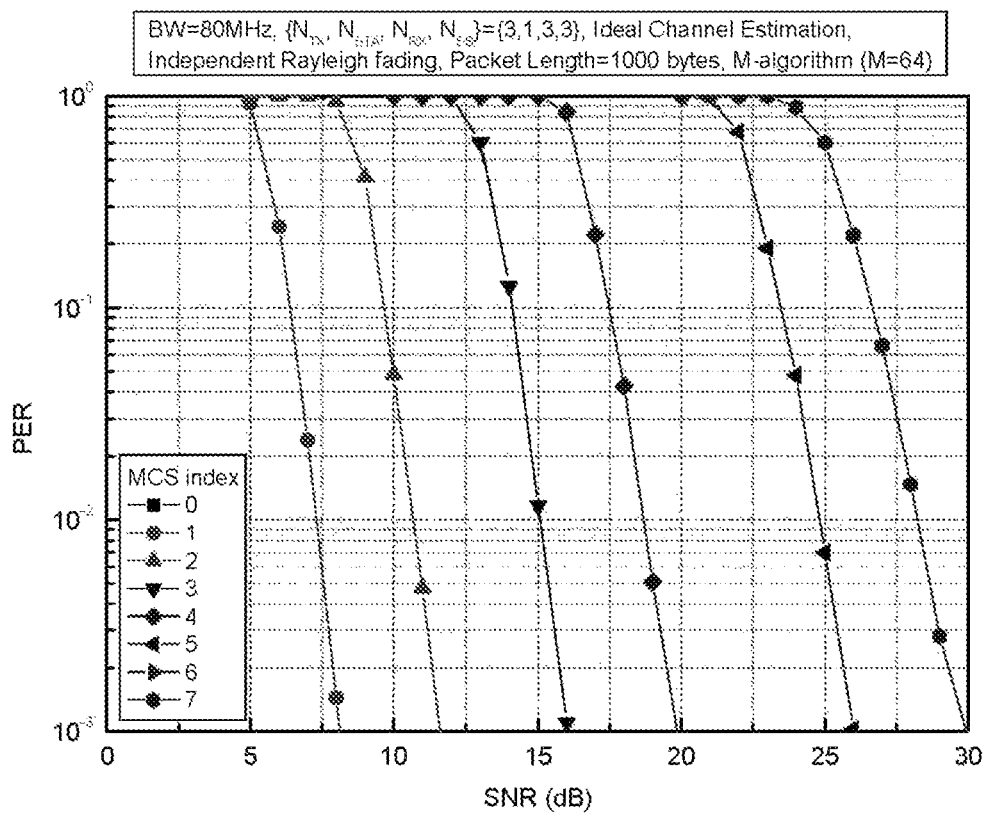
FIG. 8 shows a graph of the performance of 3×3 MIMO detector.
Figure 9:
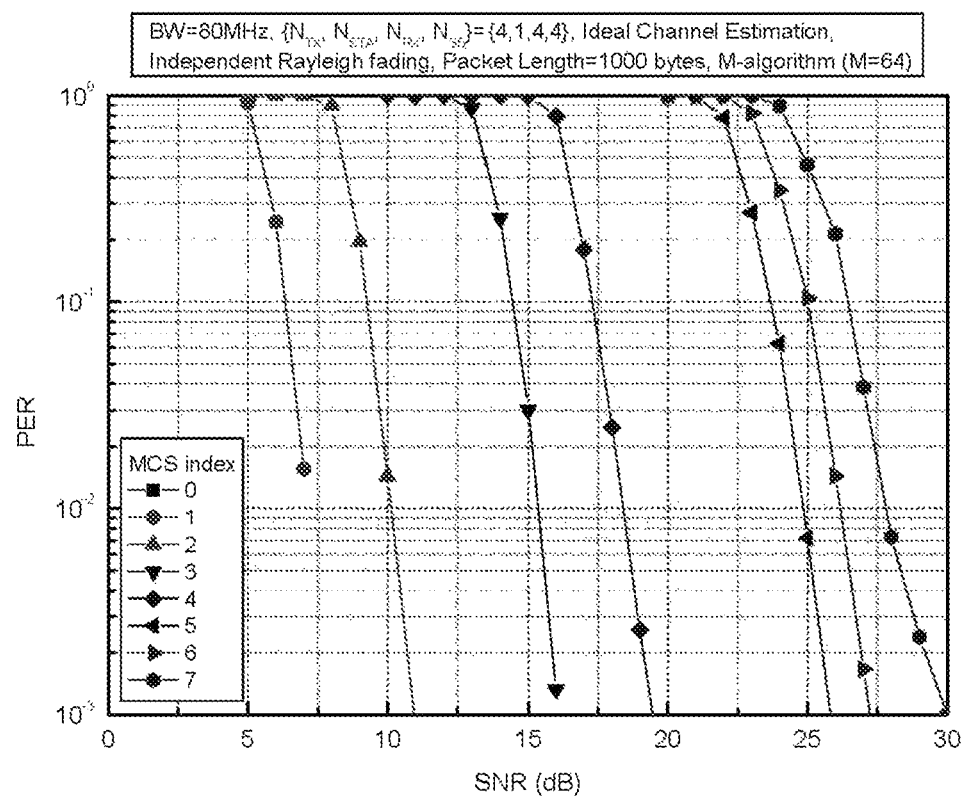
FIG. 9 is a graph of the performance of 4×4 MIMO detector.

FIGS. 7 to 9 are graphs showing the performance of the MIMO detector using the M-algorithm. FIGS. 7 to 9 show results based on a method updating the distance by calculating the most approximating four signal constellations in the updated received signal for each survivor path and selecting a minimum of M survivor paths from the 4M distances, when the number of survivor paths is M=64.

FIG. 7 shows a graph of the performance of a 2×2 MIMO detector, FIG. 8 is shows a graph of the performance of 3×3 MIMO detector, and FIG. 9 is a graph of the performance of 4×4 MIMO detector.

The following Table 4 is a table arranging a difference in performance from a soft output sphere decoding based on PER-1E-2. The result value described in the Table is a signal to noise ratio in a unit of dB.

TABLE 4

| MCS | 1 | 2 | 3 | 4 | 5 | 6 | 7 |
|---|---|---|---|---|---|---|---|
| 2 × 2 | 0 | 0 | 0 | 0 | 1.2 | 1.2 | 1.0 |
| 3 × 3 | 0 | 0 | 0.3 | 0.2 | 1.2 | Exclusion | 1.7 |
| 4 × 4 | 0 | 0 | 0.4 | 0.4 | 1.4 | 1.5 | 1.7 |

Referring to the Table 4, in the case of the 16QAM, there is a difference in performance of 1.5 dB or more. In order to reduce this, increasing the number of survivor paths does not have a meaning in terms of the complexity.

Therefore, a method for improving a difference in performance from the ML method while reducing the higher complexity due to a method for detecting a signal through the existing M-algorithm is needed.

Figure 10:
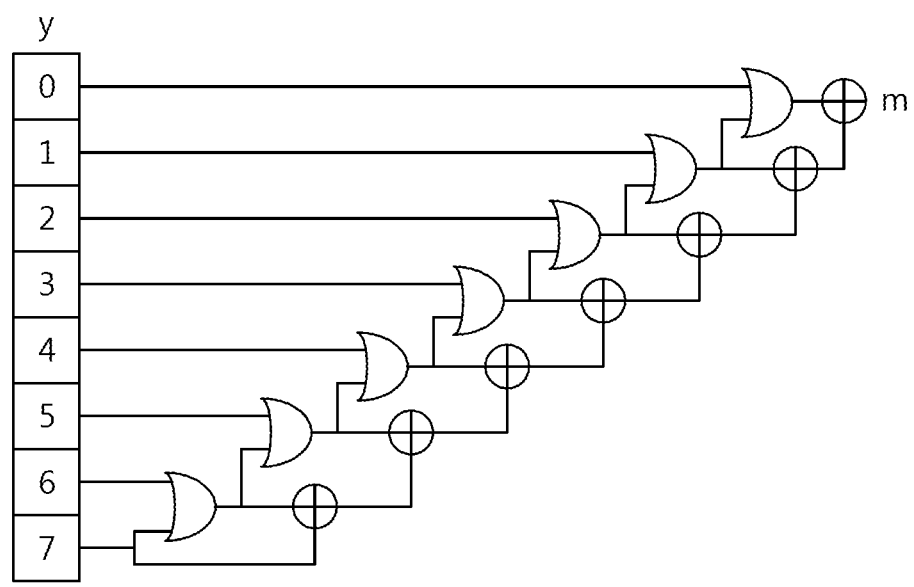
FIG. 10 shows a logical calculation algorithm performing the calculation of the uppermost bit.

<Step A> Four $\hat{s}_i$ that minimize $\|y_i - r_{ii} \hat{s}_i\|^2$ for the M survivor paths are selected. In order to remove the multiplication for forming the existing integer signal constellation, the method for searching the two signal constellations most approximating from y/r for the absolute value y of $y_i$ and the absolute value r of $r_{ii}$ can be used. To this end, the calculation of the uppermost bit digit m and the upper bit digit n of the absolute value $r_{ii}$ is needed and the method for calculating this may be performed by the logical calculation algorithm as shown in FIG. 10.

When m is equal to or smaller than n, if a value of subtracting r from y is smaller than 0, y−r and y+r are selected and otherwise, y−r and y−3r are selected.

When a value of subtracting n from m is 1, if a value of subtracting 3r from y is smaller than 0, y−3r and y−r are selected and otherwise, y−3r and y−5r are selected.

When a value of subtracting n from m is equal to or larger than 2, if a value of subtracting 5r from y is smaller than 0, y−5r and y−3r are selected and otherwise, y−5r and y−7r are selected.

The expected signal constellation can be made by combining the above selected two values into a real number and an imaginary number.

During the finding of the signal constellation, naturally calculated $y_i - r_{ii} \hat{s}_i$ may be used for the process of updating a distance. Although this performs the calculating using r of y, when $y_i$ and $r_{ii}$ has the same sign while having the same distance, the signal constellation obtained by the above Equation is used as it is and otherwise, −1 is multiplied by the signal constellation. The above method needs a maximum of three adders are needed. Therefore, in the case of the M survivor path, 3M×2 adders are needed. In addition, when one minimum value is obtained, the obtained two minimum values are compared once more.

<Step B> The distance value for 4M paths is updated. When the digit of the uppermost bit of $\|y_i - r_{ii} \hat{s}_i\|$ calculated by the logical algorithm as shown in FIG. 10 is m, $\|y_i - r_{ii} \hat{s}_i\|^2$ calculation may be substituted into an operation that shifts $\|y_i - r_{ii} \hat{s}_i\|$ by m−1. In this case, the slight deterioration in performance is shown. The deterioration in performance is insignificant when considering the condition in which the multiplier is changed into a shifter. When the additional improvement in performance is needed, if a result of shifting $\|y_i - r_{ii} \hat{s}_i\|$ by m−2 is multiplied by the second highest bit value and is added thereto, the improvement in performance can be obtained by adding only one adder. Further, the improvement in performance may be more promoted by increasing the number of adders. In this case, calculate the complexity. When being simply substituted into the shift operation, except for the complexity obtaining m, only the 8M adders are needed. When a result of shifting $\|y_i - r_{ii} \hat{s}_i\|$ by m−2 is multiplied by the second highest bit value and is added thereto so as to improve the performance, 16M adders are needed. This changes the multiplier into the shifter or changes the multiplier into the shifter and the adder.

<Step C> The M survivor paths having a minimum distance are selected among the 4M paths.

<Step D>

$$y_{i-1} = y_{i-1} - \sum_{j=1}^{4} r_{i-1,j} s_j$$

for the M survivor paths is updated. The portion removing the effect of the received signal due to $s_j$ selected for the M survivor paths is no room for improvement. However, there is a need to consider whether it is preferable to reduce calculations using a method for storing $y_j$, $i \leq j \leq 4$ calculated in advance or it is preferable to store only $s_j$ and perform the calculation every time.

<Step E> The ML estimation $\hat{s}_{ML}$ having a minimum distance is selected among the M survivor paths.

<Step F> The $\hat{s}$ having a minimum distance while having a bit different from $\hat{s}_{ML}$ is selected among the M survivor paths. Even though the complexity obtaining the minimum value is reduced, the step needs to be performed a maximum of 24 times. Therefore, the high-level complexity is still required.

Figure 11:
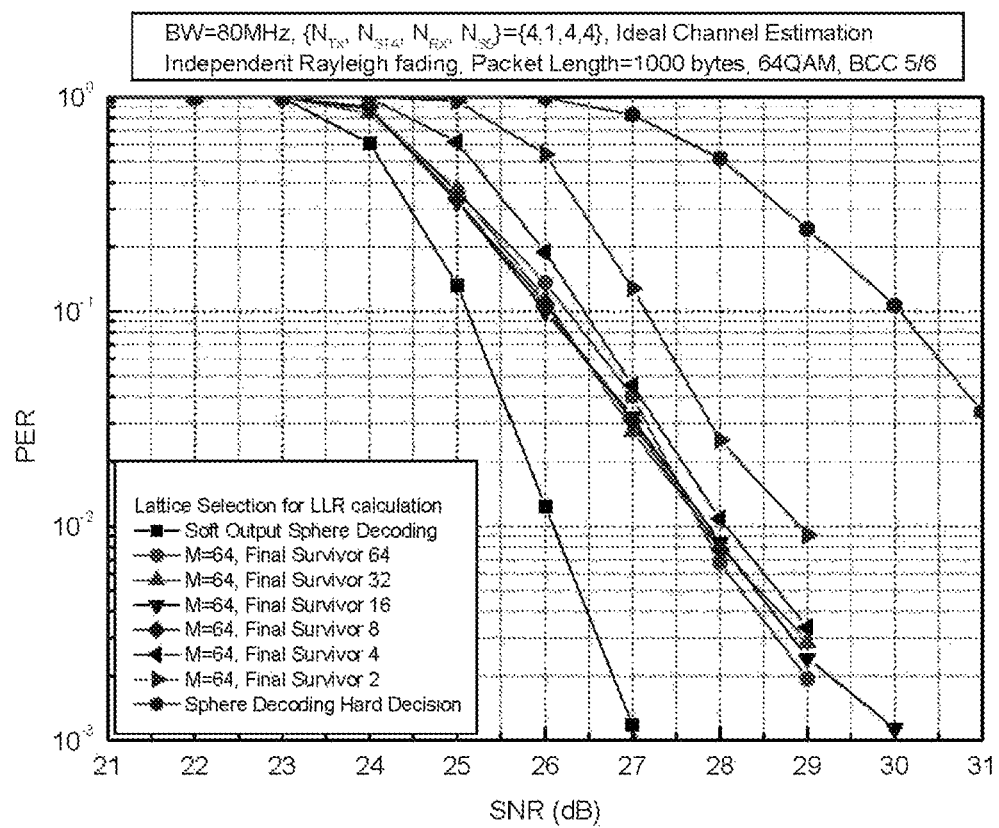
FIG. 11 is a graph showing the performance according to the change in the number of selected lattices in the 4×4 MIMO transceiving system.

FIG. 11 is a graph showing the performance according to the change in the number of selected lattices in the 4×4 MIMO transceiving system. In the case of using 64QAM and coding rate 5/6 in the 4×4 MIMO transceiving system, if the execution of the M-algorithm is completed and the LLR is calculated using the selected survivor paths, the performance analysis results are shown when selecting the paths having a small distance among the survivor paths as N∈{2,4,8,16,32,64} numbers and calculating the LLR using only the selected survivor paths.

Referring to FIG. 11, when the final survivor path is 8 or more so as to perform the LLR calculation, the difference in performance is insignificant and even in the case of 4, it can be appreciated that the difference in performance of about 0.3 dB based on PER=1E-2 as compared with the case of 64 is shown. This is compared with the serious difference in performance shown when the detection is performed by setting the number of survivor paths to 16 in the M-algorithm. That is, the more the number of survivor paths for ML estimation for each antenna step and obtaining the lattice points closest thereto, the better the performance becomes. When calculating the LLR in the survivor paths up to the final step, the difference in performance is insignificant even when about 8 having a small distance among the survivor paths are selected.

As described above, the implementation complexity may be reduced by the method for detecting an MIMO signal. In the case of the paths calculated at the final step, the step of selecting N(≈8) having a small distance value instead of the step of selecting M having a small distance value among 4M is performed and the ML estimation is obtained by obtaining the minimum value among N numbers and then, the minimum values among the lattice points having bits opposite to those of the ML estimation are sequentially obtained. When there is no lattice points having bits opposite to those of the ML estimation, the distance is mapped to a distance between the lattice points that is an N-th order.

The complexity of the steps of calculating and updating a distance and obtaining a minimum value in consideration of the improved method for detecting an MIMO signal as described above may be represented by the following Table 5.

TABLE 5

| Number of Paths (4M) | Number of Survivor Paths (M) | Final Survivor (N) | (Step A, B and D) | | | Adder | 2-1 MUX |
|---|---|---|---|---|---|---|---|
| | | | $\|\cdot\|^2$: Shift | $\|\cdot\|^2$: Shift, Addition | Multiplier | (E) and (F) | |
| 64 | 16 | 8 | 416 | 544 | 0 | 175 | 175 |
| 256 | 64 | 8 | 1,664 | 2,176 | 0 | 175 | 175 |

For the LLR calculation, the result that the number of lattice points within the sphere is enough to be about 8, the implementation complexity is improved and the improvement tendency of the M-algorithm used in advance has been shown. That is, a new method for reducing the calculation number of paths while densely filling the sphere in which N lattice points exist for the LLR calculation as maximally as possible may be proposed. The exemplary embodiment of the present invention proposes a new method for obtaining performance as maximally as possible while lowering the complexity to a possible achievable level based thereon has been proposed. The method for detecting an MIMO signal according to the exemplary embodiment of the present invention may be proposed by the following method.

<Step A> Select one $\hat{s}_i$ minimizing $\|y_i - r_{ii} \cdot \hat{s}_i\|^2$ for the M survivor paths.

<Step B> Update distance $d = d + \|y_i - r_{ii} \cdot \hat{s}_i\|^2$ for the M paths.

<Step C> Select N paths having a minimum distance among the M paths.

<Step D> Select N $\hat{s}_j$ each having a minimum distance for $\hat{s}_i$ of the selected N paths.

<Step E> Update $d = d + \|y_i - r_{ii} \cdot \hat{s}_i\|^2$ for the added $N^2$ paths.

<Step F> Select M paths having a minimum distance among the M+N2 paths.

<Step G> Update $$y_{i-1} = y_{i-1} - \sum_{j=1}^{4} r_{i-1,j} s_j$$

for the M survivor paths.

<Step H> Select N paths having a minimum distance among the $M+N^2$ final paths.

<Step I> Select the ML estimation $\hat{s}_{ML}$ having a minimum distance among the N final survivor paths.

<Step J> Select $\hat{s}$ having a minimum distance while having a bit different from $\hat{s}_{ML}$ among the N final survivor paths.

The steps of <Step A> to <Step G> are steps sequentially performed for each of the transmitting antennas configuring the MIMO transceiving system. However, when the above-mentioned method is performed on the final antenna, <Step F> is no more performed. Since the final survivor path for the final antenna is selected, <Step H> selecting the N final survivor path among the $M+N^2$ paths needs to be performed. Similarly, <Step G> is no more performed on the final antenna. The reason is that no remaining antennas are and thus, the candidate signal constellation affecting the received signal does not need to be removed.

The method for detecting an MIMO signal according to the related art performs a process of selecting a minimum of M among 4M for each antenna once, selecting a minimum of N among the M numbers, and selecting a minimum of M among $M+N^2$ twice. However, it may be performed through a simple process of changing the method of selecting among 4M into a method for selecting among $M+N^2$. The complexity except for the process of selecting minimum values may be represented by the following Table 6.

TABLE 6

| Number of Survivor Paths (M) | Final Survivor (N) | (Step A, B, D, E and G) | | | Adder | 2-1 MUX |
|---|---|---|---|---|---|---|
| | | $\|\cdot\|^2$: Shift | $\|\cdot\|^2$: Shift, Addition | Multiplier | (Step I and J) | |
| 16 | 8 | 571 | 701 | 0 | 175 | 175 |
| 64 | 8 | 1,675 | 1,901 | 0 | 175 | 175 |

Figure 12:
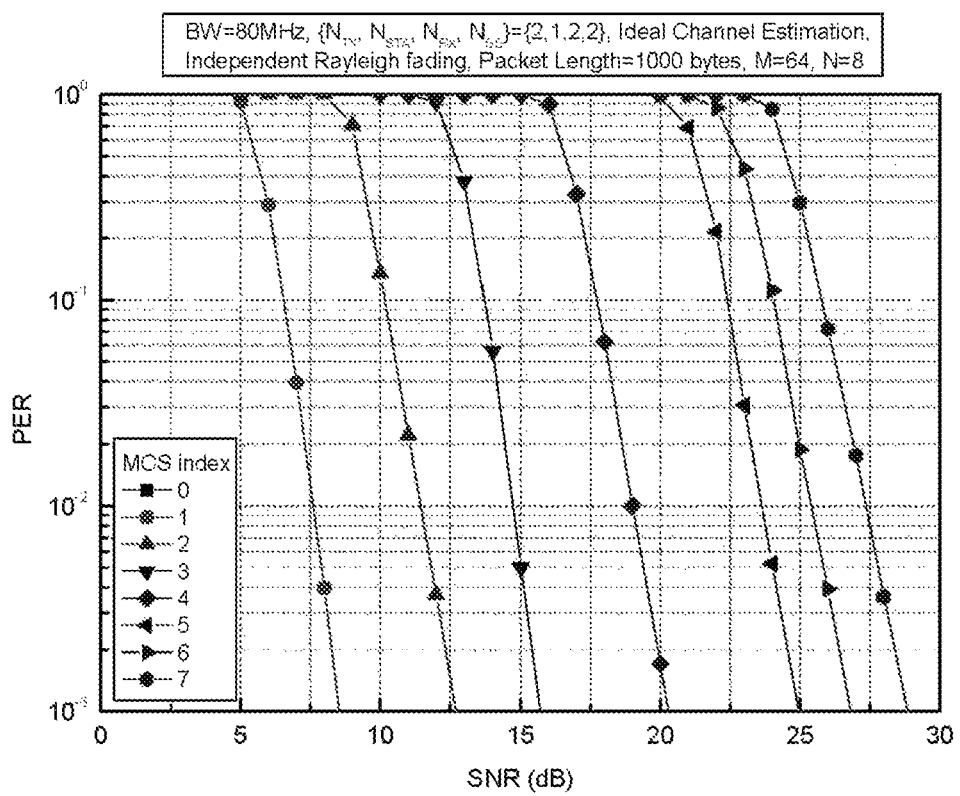
FIGS. 12 to 14 are graphs showing examples of the performance of the proposed MIMO signal detector.
Figure 13:
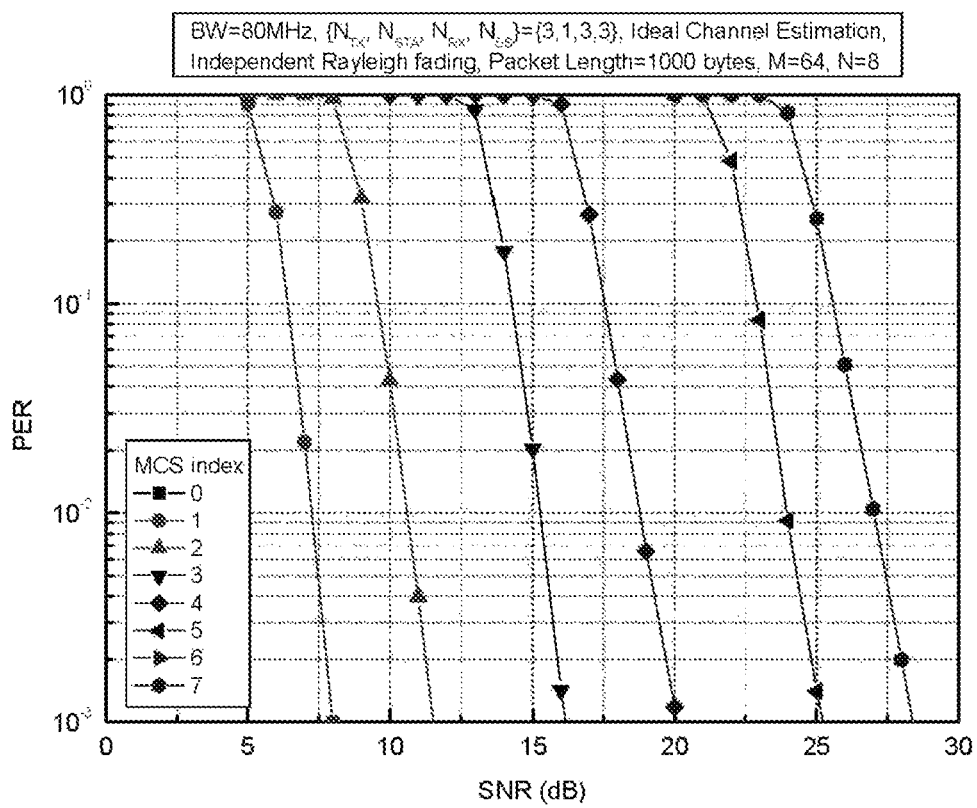
Figure 14:
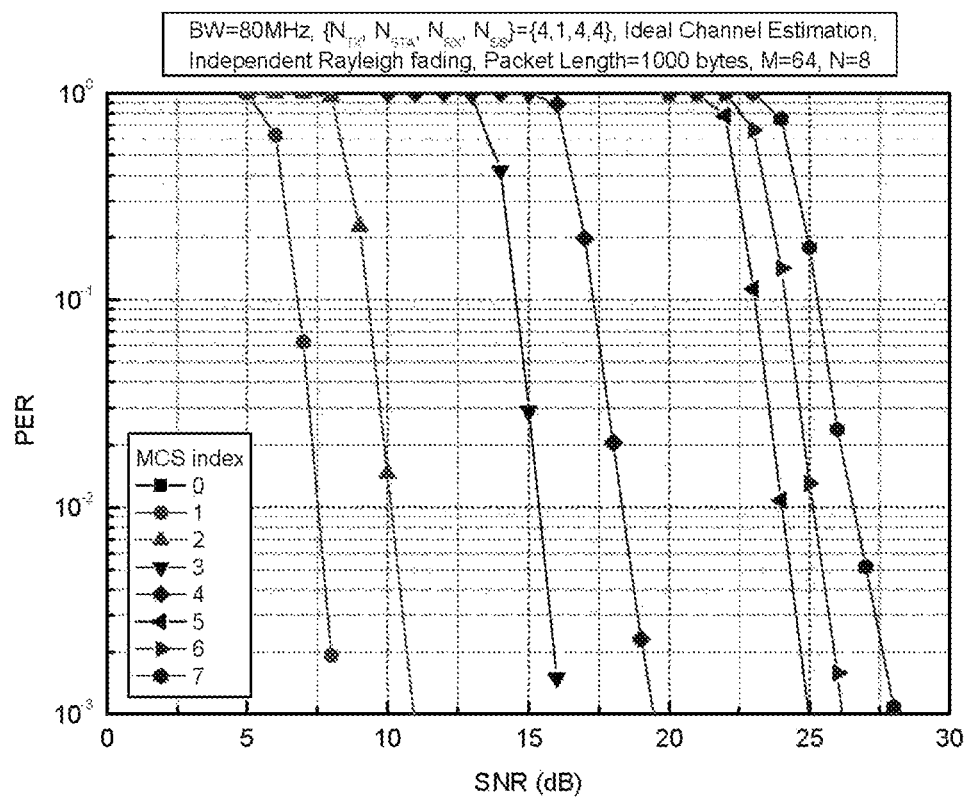

FIGS. 12 to 14 are graphs showing examples of the performance of the proposed MIMO signal detector. In the example, M=64 and N=8 are determined and the $\|\cdot\|^2$ is used as it is at the time of calculating the distance. FIG. 12 shows a graph of performance of a 2×2 MIMO transceiving system, FIG. 13 shows a graph of performance of a 3×3 MIMO transceiving system, and FIG. 14 shows a graph of performance of a 4×4 MIMO transceiving system.

The following Table 7 shows a difference in performance from the soft output sphere decoding based on PER-1E-2. A numerical value is an SNR value and is a unit of dB.

TABLE 7

| MCS | 1 | 2 | 3 | 4 | 5 | 6 | 7 |
|---|---|---|---|---|---|---|---|
| 2 × 2 | 0 | 0 | 0.0 | 0.0 | 0.2 | 0.1 | 0.0 |
| 3 × 3 | 0 | 0 | 0.4 | 0.2 | 0.4 | exclusion | 0.4 |
| 4 × 4 | 0.1 | 0 | 0.5 | 0.3 | 0.6 | 0.5 | 0.5 |

Referring to Table 7, the difference in performance is shown within about 0.6 dB and it can be appreciated that performance is improved 1 dB or more in the 64QAM scheme as compared with a scheme by which the 64 survivor paths remain by calculating 256 paths arranged in 4.

Figure 15:
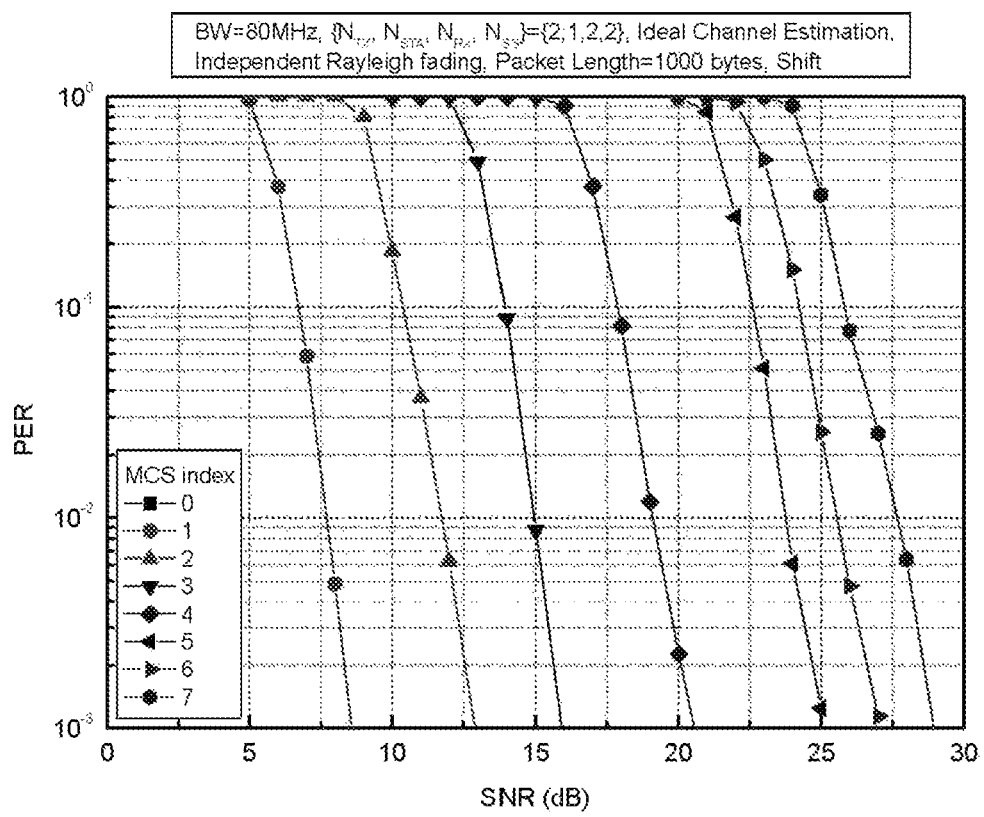
FIGS. 15 to 17 are graphs showing another example of the performance of the proposed MIMO signal detector.
Figure 16:
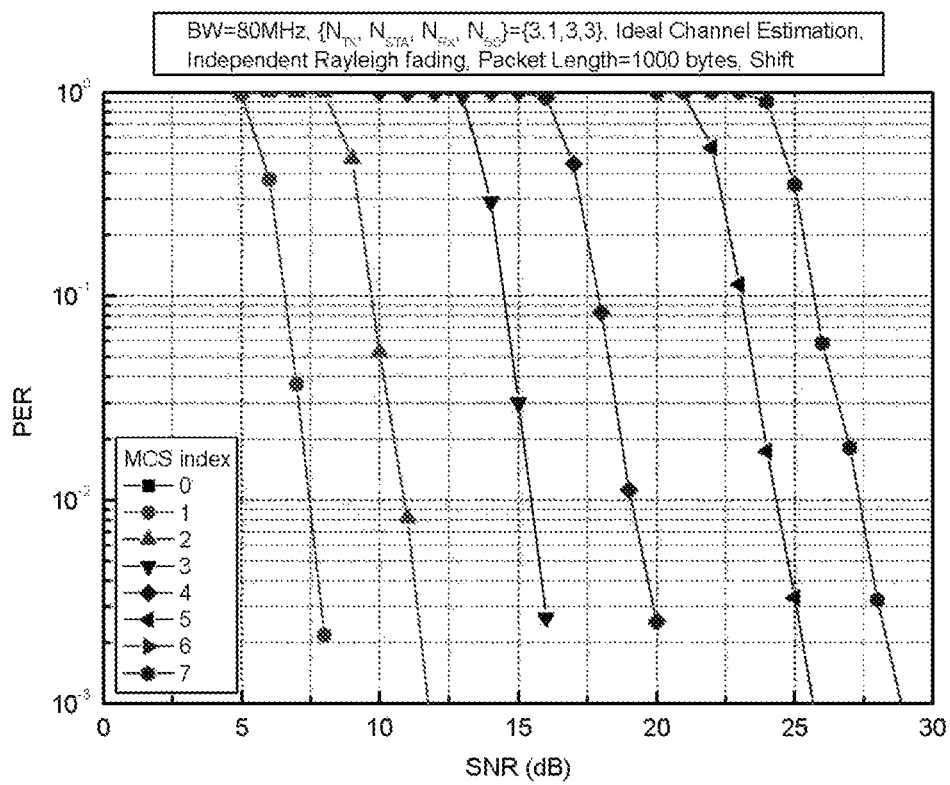
Figure 17:
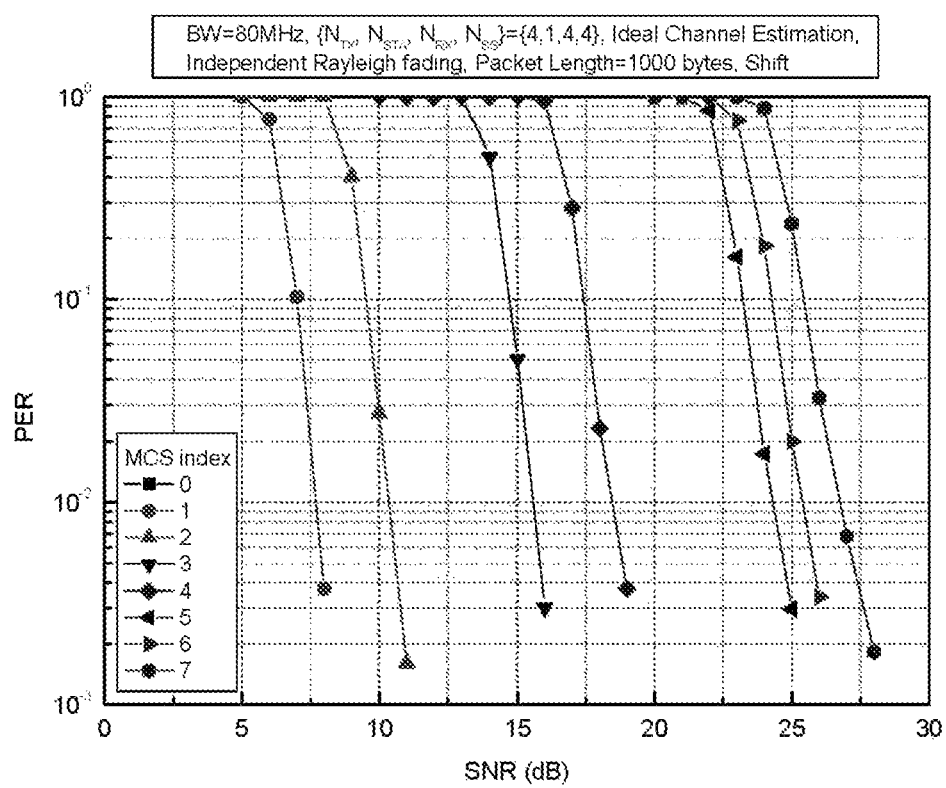

Next, FIGS. 15 to 17 are graphs showing another example of the performance of the proposed MIMO signal detector. In the example, M=64 and N=8 are determined and the $\|\cdot\|^2$ is simply substituted into a shifter. FIG. 15 shows performance in the case of a 2×2 MIMO transceiving system, FIG. 16 shows performance in the case of a 3×3 MIMO transceiving system, and FIG. 17 shows performance in the case of a 4×4 MIMO transceiving system.

The following Table 8 shows the difference in performance from the soft output sphere decoding based on PER=1E-2.

TABLE 8

| MCS | 1 | 2 | 3 | 4 | 5 | 6 | 7 |
|---|---|---|---|---|---|---|---|
| 2 × 2 | 0.2 | 0.0 | 0.2 | 0.0 | 0.3 | 0.2 | 0.2 |
| 3 × 3 | 0.1 | 0.1 | 0.6 | 0.6 | 0.8 | Exclusion | 0.7 |
| 4 × 4 | 0.4 | 0.2 | 0.6 | 0.4 | 0.9 | 0.6 | 0.6 |

Figure 18:
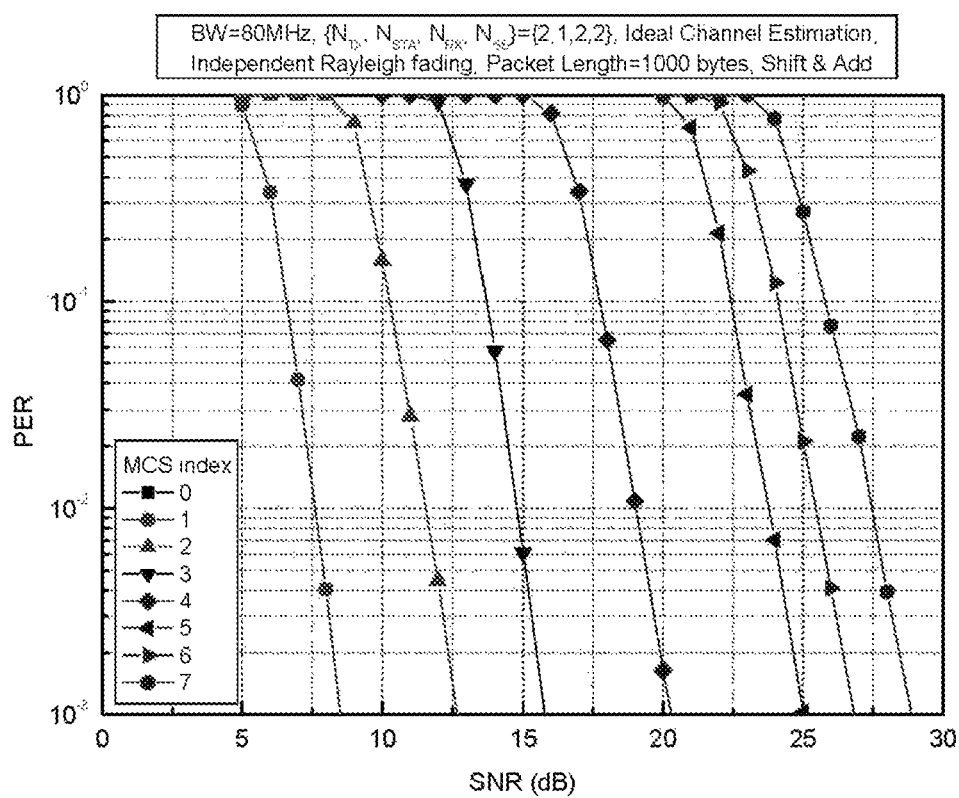
FIG. 18 shows performance in the case of a 2×2 MIMO transceiving system.
Figure 19:
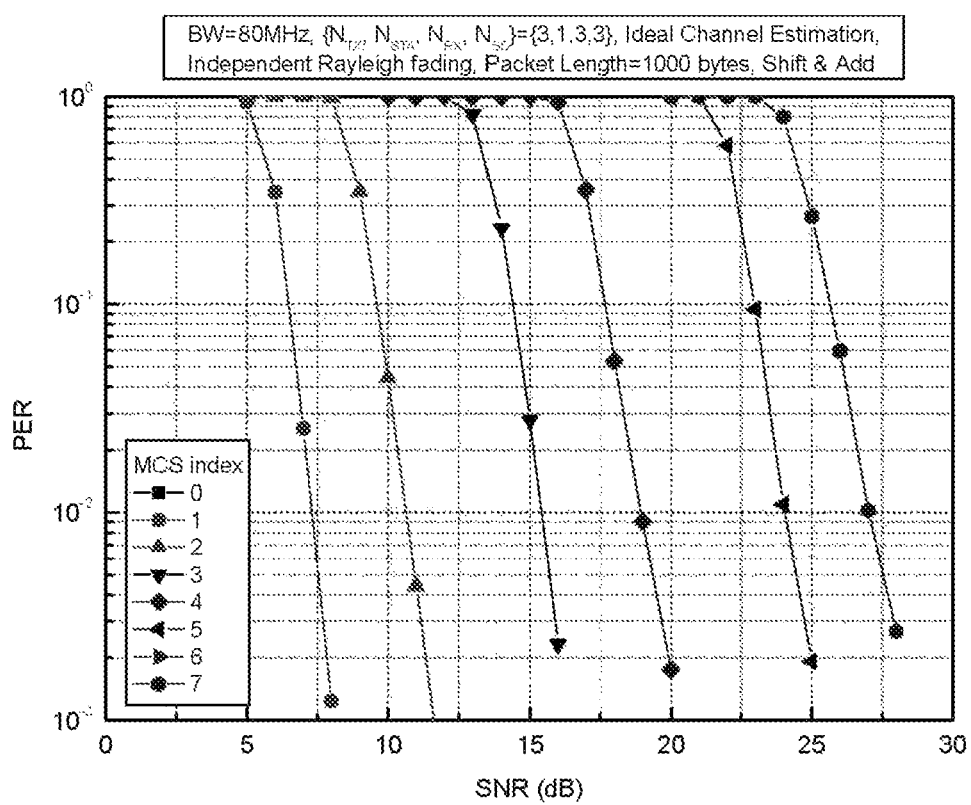
FIG. 19 shows performance in the case of a 3×3 MIMO transceiving system.
Figure 20:
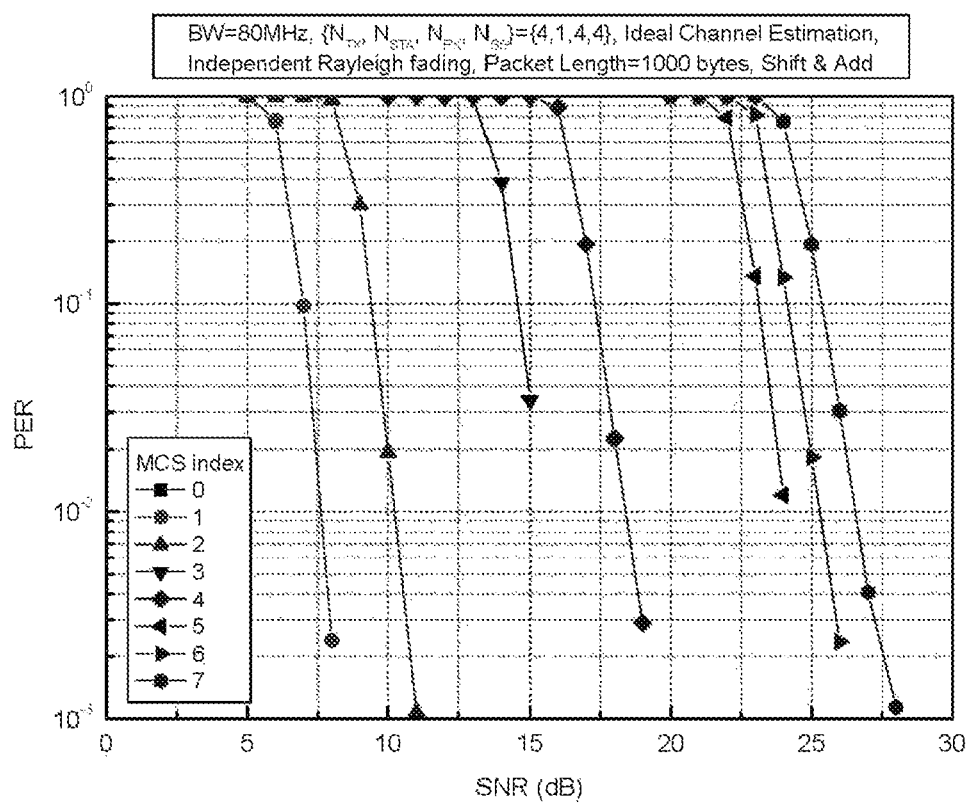
FIG. 20 shows performance in the case of a 4×4 MIMO transceiving system.

Next, FIGS. 18 to 20 are graphs showing another example of the performance of the proposed MIMO signal detector. In the example, M=64 and N=8 are determined and the $\|\cdot\|^2$ is simply substituted into the shifter and the adder. FIG. 18 shows performance in the case of a 2×2 MIMO transceiving system, FIG. 19 shows performance in the case of a 3×3 MIMO transceiving system, and FIG. 20 shows performance in the case of a 4×4 MIMO transceiving system.

The following Table 9 shows the difference in performance from the soft output sphere decoding based on PER=1E-2.

TABLE 9

| MCS | 1 | 2 | 3 | 4 | 5 | 6 | 7 |
|---|---|---|---|---|---|---|---|
| 2 × 2 | 0.1 | 0.0 | 0.1 | 0.0 | 0.3 | 0.1 | 0.2 |
| 3 × 3 | 0.0 | 0.0 | 0.5 | 0.4 | 0.5 | Exclusion | 0.4 |
| 4 × 4 | 0.3 | 0.0 | 0.6 | 0.4 | 0.7 | 0.6 | 0.5 |

As described above, the method for detecting an MIMO signal proposed in the exemplary embodiment of the present invention shows performance almost approximating the ML while having the lower complexity.

Figure 21:
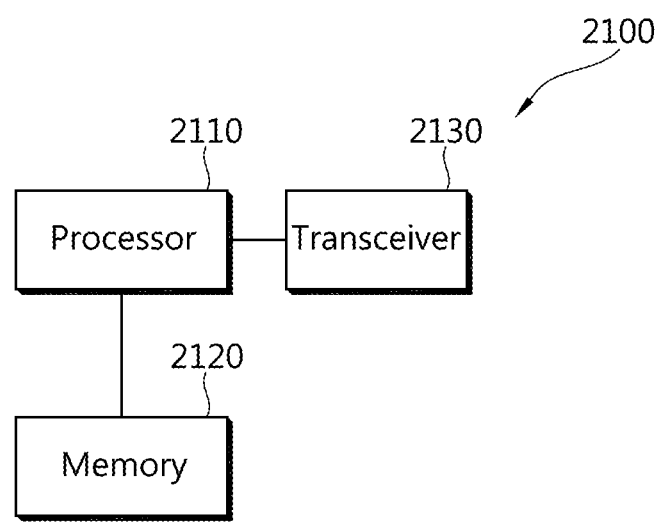
FIG. 21 is a block diagram showing a receiver in which the exemplary embodiment of the present invention is implemented.

FIG. 21 is a block diagram showing a receiver in which the exemplary embodiment of the present invention is implemented.

A receiver 2100 includes a processor 2110, a memory 2120, and a transceiver 2130.

Referring to FIG. 21, the processor 2110 implements proposed functions, processes, and/or methods. The processor 2110 receives a wireless signal, acquires the path metric for the survivor path, calculates a distance to select the next survivor path through the minimum distance value for the path. The processor 2110 may implement the exemplary embodiments of the present invention shown in FIGS. 10 to 20 and the performance thereof may be implemented. The processor 2100 may be implemented as the shifter and the adder or implemented to include them and may be used based thereon in calculating the path metric and the distance. The layers of the wireless interface protocol may be implemented by the processor 2110. The memory 2120 is connected with the processor 2100 to store various information for driving the processor 2110. The transceiver 2130 is connected with the processor 2110 to transmit and/or receive the wireless signal.

The processor 2110 and/or the RF unit 730 may include an application-specific integrated circuit (ASIC), other chipsets, logical circuits, and/or data processing apparatuses. The memory 2120 may include a read-only memory (ROM), a random access memory (RAM), a flash memory, a memory card, a storage medium, and/or other storage apparatus. The transceiver unit 2130 may include a baseband circuit for processing a wireless signal. When the embodiment is implemented by software, the above-mentioned method may be implemented by a module (process, function, or the like) that performs the above-mentioned function. The module may be stored in the memory 2120 and be performed by the processor 2110. The memory 2120 may be in or out of the processor 2110 and be connected to the processor 2110 by widely known various units.

The exemplary embodiments of the present invention can reduce the frequency of the operation needed to estimate the distance for selecting the survivor path, thereby obtaining the performance approximating the existing ML detection performance while reducing the complexity of the maximum likelihood (ML) detection.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method for detecting a Multiple Input Multiple Output (MIMO) signal in a wireless communication system, comprising:

selecting from a first antenna a plurality of first candidate signal constellations in which a first path metric for at least one first survivor path is minimal;

acquiring at least one second survivor path based on the plurality of first candidate signal constellations;

updating the at least one second survivor path to remove an effect on the at least one second survivor path due to the plurality of first candidate signal constellations;

selecting from a second antenna a plurality of second candidate signal constellations in which a second path metric for the at least one updated second survivor path is minimal;

acquiring at least one final survivor path based on the plurality of second candidate signal constellations; and acquiring a transmitting symbol among the at least one final survivor path, wherein a distance of the first survivor path is added with the first path metric so as to be updated, and a distance of the updated second survivor path is added with the second path metric so as to be updated.

2. The method of claim 1, wherein acquiring the transmitting symbol includes:

selecting an estimation symbol having a minimum distance among the at least one final survivor paths; and determining, among the at least one final survivor path, a symbol, which has a different bit from that of the estimation symbol and corresponds to a minimum distance, as the transmitting symbol.

3. The method of claim 1, wherein acquiring the at least one second survivor path includes:

acquiring a first additional path based on the plurality of first candidate signal constellations; and selecting at least one path as the at least one second survivor path among the at least one first survivor path and the first additional path, the at least one path having a minimum distance.

4. The method of claim 1, wherein acquiring the at least one final survivor path includes:

acquiring a second additional path based on the plurality of second candidate signal constellations; and selecting at least one path as the at least one final survivor path among the at least one updated second survivor path and the second additional path, the at least one path having a minimum distance.

5. The method of claim 3, wherein acquiring the first additional path includes:

selecting, among the at least one first survivor path, N first intermediate paths in which a distance of a first survivor path is minimal; and selecting N first additional signal constellations having a minimum distance in the plurality of first candidate signal constellations for each of the first intermediate paths to acquire $N^2$ first additional paths.

6. The method of claim 5, wherein N is equal to or less than M that is the number of the at least one first survivor path.

7. A wireless device, comprising:
a transceiver receiving a wireless signal; and
a processor operatively coupled to the transceiver;
wherein the transceiver includes a first antenna and a second antenna, and wherein the processor is configured for:

selecting from a first antenna a plurality of first candidate signal constellations in which a first path metric for at least one first survivor path is minimal;

acquiring at least one second survivor path based on the plurality of first candidate signal constellations;

updating the second survivor path to remove an effect on the second survivor path due to the plurality of first candidate signal constellations;

selecting from a second antenna a plurality of second candidate signal constellations in which a second path metric for the at least one updated second survivor path is minimal;

acquiring at least one final survivor path based on the plurality of second candidate signal constellations; and acquiring a transmitting symbol among the at least one final survivor path, wherein a distance of the first survivor path is added with the first path metric so as to be updated, and a distance of the updated second survivor path is added with the second path metric so as to be updated.

8. The wireless device of claim 7, wherein the processor includes a shifter and an adder, and the first path metric and the second path metric are calculated by the shifter and the adder.

9. The wireless device of claim 7, wherein the processor includes a shifter, and the first path metric and the second path metric are calculated by the shifter.

10. The wireless device of claim 7, wherein acquiring the at least one second survivor path includes:

acquiring a first additional path based on the plurality of first candidate signal constellations; and selecting at least one path as the at least one second survivor path among the at least one first survivor path and the first additional path, the at least one path having a minimum distance.

11. The wireless device of claim 10, wherein acquiring the first additional path includes:

selecting, among the at least one first survivor path, N first intermediate paths in which a distance of the first survivor path is minimal; and selecting N first additional signal constellations having a minimum distance in the plurality of first candidate signal constellations for each of the first intermediate paths to acquire $N^2$ first additional paths.

12. The wireless device of claim 11, wherein N is equal to or less than M that is the number of the at least one first survivor path.

* * * * *